(12) United States Patent
Addison

(10) Patent No.: US 7,771,597 B2
(45) Date of Patent: Aug. 10, 2010

(54) FILTER SYSTEM

(75) Inventor: Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 550 days.

(21) Appl. No.: 11/704,917

(22) Filed: Feb. 12, 2007

(65) Prior Publication Data

US 2008/0190835 A1 Aug. 14, 2008

(51) Int. Cl.
*B01D 24/40* (2006.01)
(52) U.S. Cl. .................................. 210/291; 210/456
(58) Field of Classification Search ................ 210/263, 210/264, 291, 289, 519, 456, 617, 807
See application file for complete search history.

(56) References Cited

U.S. PATENT DOCUMENTS

| | | | |
|---|---|---|---|
| 3,994,803 A | 11/1976 | Neff et al. | |
| 5,232,585 A | 8/1993 | Kanow | |
| 5,496,472 A | 3/1996 | Slack et al. | |
| 5,512,174 A | * | 4/1996 | Capon .................. 210/264 |
| 6,190,548 B1 | 2/2001 | Frick | |

OTHER PUBLICATIONS

Four (4) pages from web page of F.B. Leopold Company Inc. describing elimi-NITE denitrification system.
Evaluating Denitrification Filters, pp. 1 to 8, Jun. 2005.

* cited by examiner

*Primary Examiner*—Matthew O Savage
(74) *Attorney, Agent, or Firm*—Merek, Blackmon & Voorhees, LLC

(57) ABSTRACT

A filter system for clarifying water or wastewater. The filter system includes at least one filter compartment having at least one layer of filter media and an underdrain. The at least one layer of filter media removes impurities from the influent passing therethrough. An influent feed trough is operably associated with the filter compartment for directing influent to the filter compartment for subsequent filtration. Preferably, the influent feed trough is disposed outside of the filter compartment. Further, the influent feed trough preferably includes a bottom that is disposed above the at least one layer of filter media. A control member is provided to control the flow of liquid between the influent feed trough and the at least one filter compartment. The control member can be a weir plate or one of more chamfered surfaces. Alternatively, the control member could include both a weir plate and one or more chamfered surfaces operably associated with the weir plate. The control member is designed to provide a cost effective method of controlling the flow of influent between the influent feed trough and the filter compartment.

23 Claims, 3 Drawing Sheets

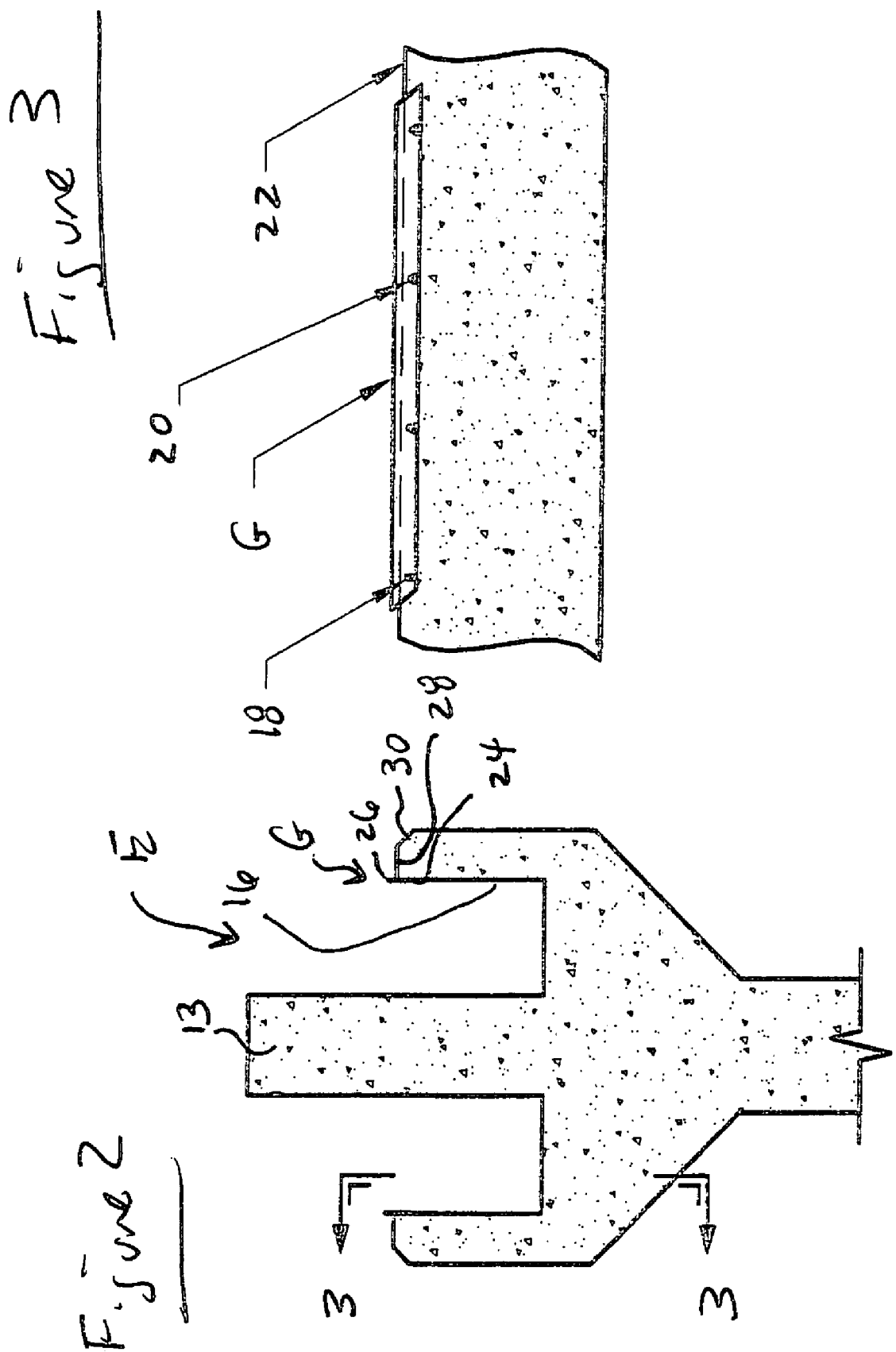

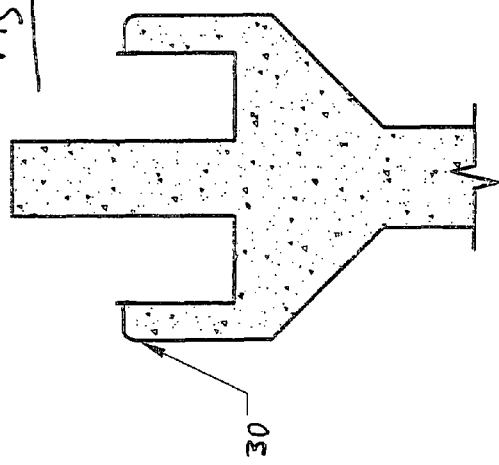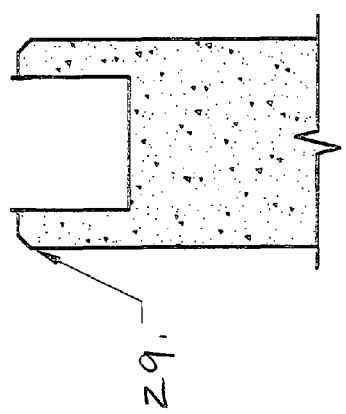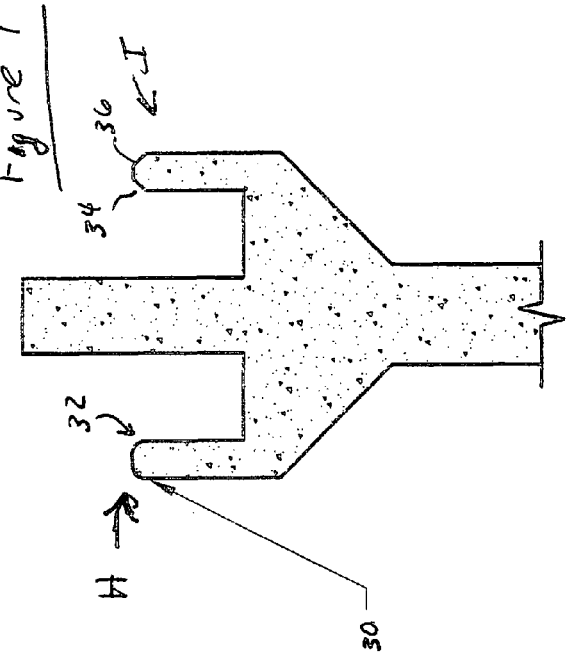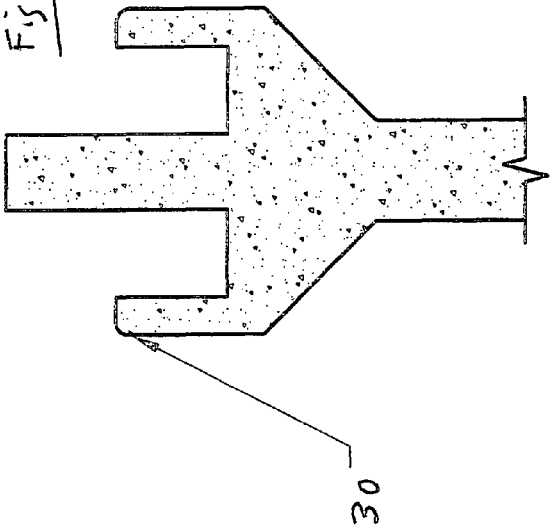

FILTER SYSTEM

FIELD OF THE INVENTION

The present invention is directed to a filter system for filtering water and/or wastewater. More particularly, in its most preferred form, the present invention is directed to a filter system having at least one filter compartment, at least one influent feed trough operably associated with the filter compartment for directing influent to the filter compartment for subsequent filtration and means for controlling the flow of influent from the influent feed trough to the filter compartment to optimize the filtration process.

BACKGROUND OF THE INVENTION

Numerous different filter systems have been employed to filter or clarify water or wastewater. Previously developed filter systems include upflow filters, downflow filters, bi-flow filters as well as filter systems including a combination of two or more of the aforementioned filters. Modular filter systems have also been used to filter water and/or wastewater. Modular filter systems have a plurality of filter compartments or cells rather than a single large filter bed for a given unit. Modular filter systems were primarily developed to reduce the size and complexity of the backwash or cleaning structure of single, large filter beds as well as obviate the need for a total system shutdown during the backwash or cleaning procedure.

Various means have been employed to direct influent to the filter to remove the desired amount of impurities from the influent. These means include piping or similar conduits that direct influent upwardly or downwardly through a filter bed. Further, troughs have been used to direct influent downwardly through one or more filter beds. It is important to control the flow of influent to the filter bed in order to optimize the efficiency of the filter. For example, gravel layers have been used in upflow filters to uniformly distribute influent through a filter bed. Concrete, arcuate weir blocks have been used to control the flow of influent from a feed trough to one or more denitrification filter compartments as is disclosed in U.S. Pat. No. 5,496,472. These weir blocks are placed on the uppermost horizontal surface of the feed trough. The juncture between the weir blocks and the uppermost horizontal surface of the feed trough must be adequately sealed. Further, the weir blocks must be must be adequately secured to the feed trough. These concrete weir blocks are not a cost effective means to control the flow of influent from the feed trough to the corresponding filter beds. Further, the weir blocks are time consuming to install. The elimi-Nite system marketed by F. B. Leopold replaces the concrete, arcuate weir blocks with a curved stainless steel weir. This type of weir suffers from similar problems as those encountered by the concrete, arcuate weir block.

OBJECTS AND SUMMARY OF THE INVENTION

An object of the preferred embodiment of the present invention is to provide a novel and unobvious filter system.

Another object of a preferred embodiment of the present invention is to provide a filter system that overcomes one or more disadvantages of previously known filter systems.

A further object of a preferred embodiment of the present invention is to provide cost effective means for controlling the flow of influent from an influent feed trough to one or more filter compartments to optimize filtration.

Yet still another object of the present invention is to provide means for controlling the flow of influent from an influent feed trough to one or more filter compartments that can be readily installed by relatively unskilled laborers.

Still a further object of a preferred embodiment of the present invention is to provide means for controlling the flow of influent from an influent feed trough to one or more filter compartments that can be used in numerous different filter systems including standard filter systems as well as denitrification filter systems.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a filter system for clarifying water or wastewater. The filter system includes at least one filter compartment having at least one layer of filter media and an underdrain. The at least one layer of filter media is disposed above an underdrain. The filter compartment has at least one inner wall. An influent feed trough is operably associated with the filter compartment for directing influent to the filter compartment for subsequent filtration. The influent feed trough is disposed outside of the filter compartment. The influent feed trough has a bottom. The bottom of the influent feed trough is disposed above the at least one layer of filter media. The filter system further includes a weir plate for controlling the flow of in fluent into the filter compartment. The weir plate has an upper end and a lower end. The lower end extends into the influent feed trough and the upper end extends above the at least one inner wall of the filter compartment.

Another embodiment of the present invention is directed to a filter system for clarifying water or wastewater. The filter system comprises at least one filter compartment having at least one layer of filter media and an underdrain. The at least one layer of filter media is disposed above an underdrain. The filter compartment has at least one inner wall. An influent feed trough is operably associated with the filter compartment for directing influent to the filter compartment for subsequent filtration. The influent feed trough is disposed outside of the filter compartment. A first portion of the at least one inner wall of the filter compartment forms a wall of the influent feed trough. The first portion has a chamfered surface. The filter system further includes a weir plate operably associated with the influent feed trough for directing influent into the filter compartment for subsequent filtration.

A further embodiment of the present invention is directed to a filter system for clarifying water or wastewater. The filter system includes at least one filter compartment having at least one layer of filter media and an underdrain. The at least one layer of filter media is disposed above an underdrain. The filter compartment has at least one inner wall. The at least one inner wall is formed as one-piece. An influent feed trough is operably associated with the filter compartment for directing influent to the filter compartment for subsequent filtration. A first portion of the inner wall of the filter compartment forms a wall of the influent feed trough. The first portion has a first chamfered surface. The first chamfered surface is disposed such that influent flowing from the influent feed trough during filtration passes over the first chamfered surface and into the filter compartment.

BRIEF DESCRIPTION OF THE DRAWINGS

FIG. 2 is an enlarged elevational view of a portion of the filter system depicted in FIG. 1.

FIG. 3 is a cross-sectional view taken along lines 3-3 in FIG. 2.

FIGS. 4 to 7 depict several of many possible alternative configurations for the enlarged portion of the filter system depicted in FIG. 2.

DETAILED DESCRIPTION OF THE PREFERRED EMBODIMENT OF THE INVENTION

Figure 1:
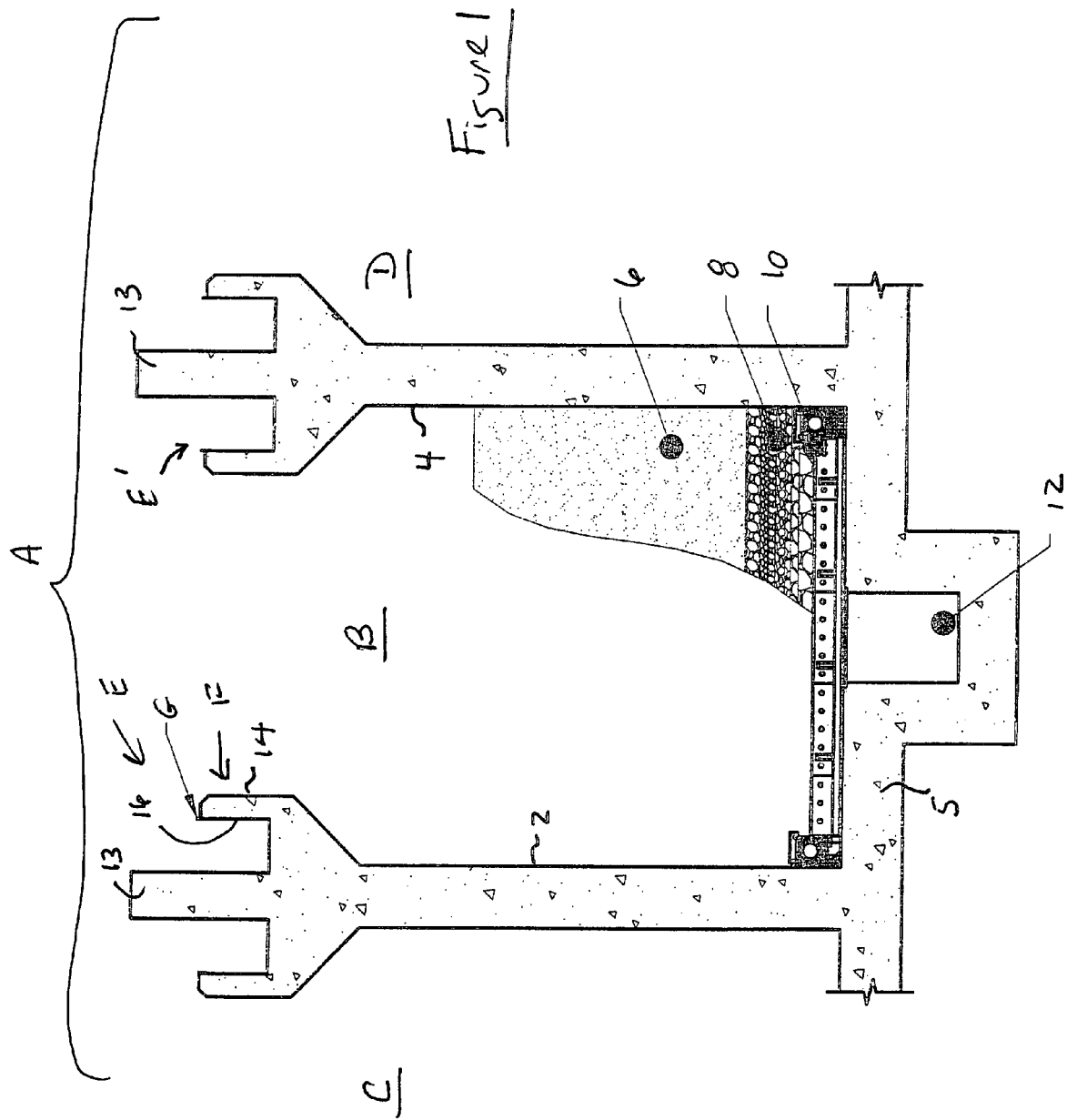
FIG. 1 is an elevational view of a filter system formed in accordance with the most preferred embodiment of the present invention.

The most preferred forms of the invention will now be described with reference to FIGS. 1-7. The appended claims are not limited to the most preferred forms and no term used herein is to be given a meaning other than its ordinary meaning unless otherwise stated.

FIGS. 1 Through 3

Referring to FIGS. 1 to 3, a filter system A is illustrated in one of many possible configurations. The filter system includes a plurality of filter compartments only three of which are shown, i.e., filter compartments B, C and D. Only filter compartment B is shown in detail. However, it will be readily understood that filter compartments C and D are configured in similar manners. While a plurality of filter compartments are shown, it will be readily appreciated that the present invention can be used in filters having a single, large filter compartment.

Filter compartment A preferably has a rectangular configuration with four inner walls, only two of which are shown in FIG. 1 (i.e., inner walls 2 and 4) and a bottom 5. It will be readily appreciated that filter compartment can take other shapes including but not limited to a circular configuration. At least one layer of media 6 is housed in filter compartment B. Filter layer 6 may be formed from any suitable media including buoyant media, non-buoyant media, plastic media or naturally occurring media. Filter layer 6 may be supported by one or more gravel support layers 8. Preferably, the gravel is supported by an underdrain system 10. The underdrain system 10 maybe of any suitable type. The underdrain system 10 may include means for directing a washing liquid (e.g. filtered water or unfiltered water) and air through the filter media during washing to remove impurities trapped in the filter layer 6 during filtration. The underdrain system 10 also directs effluent filtered by the at least one filter layer 6 to flume 12 formed in bottom 5 of filter compartment B. Flume 12 carries the effluent to a storage device or area. Flume 12 is depicted as a center, recessed flume. However, any suitable flume may be employed. While the embodiment depicted in FIG. 1 is a gravity fed system where the direction of influent during filtration is opposite to the direction of the washing fluids during cleaning, the present invention can be used in other filter systems including but not limited to bi-flow filters.

As seen in FIGS. 1 and 2, influent feed troughs E and E' are preferably disposed on the exterior of filter compartment B and extend along substantially the entire length of the corresponding wall (i.e., walls 2 and 4, respectively) of filter compartment B. The influent feed troughs E and E' direct influent to filter compartment B for subsequent filtration. Influent feed troughs E and E' are connected to a water supply source by any suitable means. Wall 13 may be provided to separate the influent feed troughs E and E' of filter compartment B from the influent feed trough of an adjacent filter compartment.

The details of influent feed trough will now be described with reference influent feed trough E as influent feed trough E' is a mirror image of influent feed trough E. The inner surface 14 of wall portion F forms a portion of the inner wall 2 of filter compartment B. Wall portion F also forms one sidewall of influent feed trough E. As seen in FIG. 1, wall portion F extends inwardly from the lower portion of inner wall 2 whereby at least a portion of the influent feed trough E is disposed above filter compartment B such that a vertical line passing through the at least one layer of filter media 6 passes through influent feed trough E. Surface 16 of wall portion F forms a substantially planar inner surface of influent feed trough E. Hence, the influent feed trough E and filter compartment B have a common wall portion. Referring to FIGS. 2 and 3, a weir plate G is attached to surface 16. Preferably, weir plate G extends substantially the length of the influent feed trough E. Preferably, weir plate G has a plurality of slots 18 that receive conventional anchors 20 to anchor weir plate G to surface 16. The slots may be circular in shape. Alternatively, the slots may be elongated to allow for adjustment of the height of weir plate G relative to the top 22 of influent feed trough E. As is seen in FIG. 2, weir plate G preferably does not rest on top 22 but rather is offset horizontally from wall portion F.

Preferably, weir plate G has a substantially uniform thickness and is generally flat. Preferably, weir plate G has a thickness substantially less that the thickness of wall portion F and most preferably less than half of the thickness of wall portion F. Preferably, filter compartment B is formed from concrete and weir plate G is formed from a material other than concrete. The lower end 24 of weir plate G extends into influent feed trough E while the upper end 26 extends above top 22. Weir plate G provides for a uniform flow of influent into filter compartment B over the entire length of influent feed trough E.

Top 22 preferably includes a substantially horizontally extending section 28 and a chamfered section 30. Section 28 is disposed directly adjacent weir plate G while section 30 is removed from weir plate G. Chamfered section 30 can be preformed or formed by removing a corner in wall portion F. Chamfered section 30 is substantially planar and forms an angle of between 0 degrees and 90 degrees with a vertical plane extending into filter compartment B and parallel to surface 14. Most preferably, chamfered section 30 forms an angle of approximately 45 degrees with a vertical plane extending into the filter compartment B and parallel to surface 14. Chamfered surface 30 is downstream of weir plate G such that influent passing over weir plate G subsequently passes over chamfered section 30. Chamfered section 30 serves to optimize the flow conditions of influent passing into filter compartment B.

FIG. 4

FIG. 4 illustrates one possible alternative configuration for the enlarged portion of the filter system depicted in FIG. 2. Wall 13 has been removed so that a single influent feed trough 29 directs influent to two adjacent filter compartments.

FIG. 5

FIG. 5 illustrates another alternative configuration for the enlarged portion of the filter system depicted in FIG. 2. The only difference between the configuration depicted in FIG. 2 from that depicted in FIG. 5 is chamfered section 30 is curvilinear as opposed to substantially planar.

FIG. 6

FIG. 6 illustrates another alternative configuration for the enlarged portion of the filter system depicted in FIG. 2. The only difference between the configuration depicted in FIG. 2 from that depicted in FIG. 6 is the weir plate G has been omitted.

FIG. 7

FIG. 7 illustrates another alternative configuration for the enlarged portion of the filter system depicted in FIG. 2. Like the embodiment depicted in FIG. 6, the weir plate G has been removed. In this instance, weir plate G is replaced with curvilinear section 32 on wall portion H. Wall portion I also lacks a weir plate. Wall portion I is further formed with chamfered sections 34 and 36, each of which is substantially planar. Influent flowing from the influent feed trough during filtration passes over chamfered section 34 prior to passing over chamfered section 36.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A filter system for clarifying water or wastewater, said filter system comprising:
   (a) at least one filter compartment having at least one layer of filter media and an underdrain, said at least one layer of filter media being disposed above said underdrain, said filter compartment having at least one inner wall;
   (b) an influent feed trough operably associated with said filter compartment for directing influent to said filter compartment for subsequent filtration, said influent feed trough being disposed outside of said filter compartment, said influent feed trough having a bottom and first and second sidewalls, said bottom of said influent feed trough being disposed above said at least one layer of filter media; and,
   (c) a weir plate for controlling the flow of influent into said filter compartment, said weir plate being a separate piece from said influent feed trough, said weir plate having an upper end and a lower end, said lower end extending into said influent feed trough and said upper end extends above an uppermost portion of at least one of said first and second sidewalls of said influent feed trough.

2. A filter system as set forth in claim 1, wherein:
   (a) a first portion of said inner wall of said filter compartment forms a wall of said influent feed trough, said first portion including a substantially planar surface oriented at a first angle to a vertical plane passing through said filter compartment, said first angle is greater than 0 degrees but less than 90 degrees.

3. A filter system as set forth in claim 1, wherein:
   (a) said weir plate is secured to an inner surface of said influent feed trough.

4. A filter system as set forth in claim 1, wherein:
   (a) a first portion of said inner wall of said filter compartment forms a wall of said influent feed trough, said weir plate is offset horizontally from said first portion of said inner wall of said filter compartment.

5. A filter system as set forth in claim 1, wherein:
   (a) a first portion of said inner wall of said filter compartment forms a wall of said influent feed trough, said weir plate has a thickness substantially less than a thickness of said first portion of said inner wall of said filter compartment.

6. A filter system as set forth in claim 5, wherein:
   (a) said weir plate has a thickness less than half of the thickness of said first portion.

7. A filter system as set forth in claim 1, wherein:
   (a) said weir plate has a uniform thickness and is substantially flat.

8. A filter system as set forth in claim 1, wherein:
   (a) a first portion of said inner wall of said filter compartment forms a wall of said influent feed trough, said first portion of said inner wall of said filter compartment is formed from concrete and said weir plate is formed from a material other than concrete.

9. A filter system as set forth in claim 1, wherein:
   (a) a first portion of said inner wall of said filter compartment forms a wall of said influent feed trough, said first portion having a chamfered surface operably associated with said weir plate such that influent passing over said weir plate subsequently passes over said chamfered surface.

10. A filter system for clarifying water or wastewater, said filter system comprising:
    (a) at least one filter compartment having at least one layer of filter media and an underdrain, said at least one layer of filter media being disposed above said underdrain, said filter compartment having at least one inner wall;
    (b) an influent feed trough operably associated with said filter compartment for directing influent to said filter compartment for subsequent filtration, said influent feed trough having first and second sidewalls, said influent feed trough being disposed outside of said filter compartment, a first portion of said at least one inner wall of said filter compartment forming a wall of said influent feed trough, said first portion having a chamfered surface, and,
    (c) a weir plate operably associated with said influent feed trough for directing influent into said filter compartment for subsequent filtration, at least a portion of said weir plate extends above an uppermost portion of at least one of said first and second sidewalls of said influent trough.

11. A filter system as set forth in claim 10, wherein:
    (a) said weir plate is offset horizontally from said chamfered surface of said first portion of said at least one inner wall.

12. A filter system as set forth in claim 10, wherein:
    (a) said weir plate is disposed upstream of said first portion relative to direction of influent flow during filtration.

13. A filter system as set forth in claim 10, wherein:
    (a) at least a portion of said weir plate extends into said influent feed trough.

14. A filter system as set forth in claim 13, wherein:
    (a) said weir plate is secured to an inner surface of said influent feed trough.

15. A filter system for clarifying water or wastewater, said filter system comprising:
    (a) at least one filter compartment having at least one layer of filter media and an underdrain, said at least one layer of filter media being disposed above said an underdrain, said filter compartment having at least one inner wall, said at least one inner wall being formed as one-piece;

(b) an influent feed trough operably associated with said filter compartment for directing influent to said filter compartment for subsequent filtration; and, (c) a first portion of said inner wall of said filter compartment forms a wall of said influent feed trough, said first portion having a first chamfered surface, said first chamfered surface being disposed such that influent flowing from said influent feed trough during filtration passes over an uppermost portion of said inner wall and over said first chamfered surface and into said filter compartment; and (d) said first portion being disposed above and inwardly from a second portion of said inner wall of said filter compartment whereby at least a portion of said influent feed trough is disposed above said filter compartment such that a vertical line passing through said at least one layer of filter media passes through said influent feed trough.

16. A filter system as set forth in claim 15, wherein:
(a) said first chamfered surface is arcuate.

17. A filter system as set forth in claim 15, wherein:
(a) said first chamfered surface is substantially planar.

18. A filter system as set forth in claim 15, wherein:
(a) said first portion of said inner wall of said filter compartment includes a second chamfered surface, said second chamfered surface being disposed relative to said first chamfered surface such that influent flowing from said influent feed trough during filtration passes over said second chamfered surface prior to passing over said first chamfered surface.

19. A filter system as set forth in claim 18, wherein:
(a) said first chamfered surface and said second chamfered surface are arcuate.

20. A filter system as set forth in claim 18, wherein:
(a) said first chamfered surface and said second chamfered surface are substantially planar.

21. A filter system as set forth in claim 15, further including:
(a) at least two filter compartments, said influent feed trough directing influent during filtration into each of said at least two filter compartments.

22. A filter system as set forth in claim 21, wherein:
(a) said at least two filter compartments have at least one common wall.

23. A filter system as set forth in claim 22, wherein:
(a) said at least two filter compartments are denitrification filter compartments.

* * * * *